US012806966B2

(12) United States Patent
Paliwal et al.

(10) Patent No.: US 12,806,966 B2
(45) Date of Patent: Nov. 24, 2026

(54) SYSTEM TO ENSURE SMOOTH ON-CHIP OPERATION DURING AUTOMOTIVE COOLING PUMP MALFUNCTION

(71) Applicant: QUALCOMM Incorporated, San Diego, CA (US)

(72) Inventors: Niraj Shantilal Paliwal, Nasik (IN); Kalyan Inamdar, Pune (IN); Akashdeep Gangrade, Ludhiana (IN); Nikhil Rajendra Patil, Bengaluru (IN); Vipul Deepak Ahuja, Bengaluru (IN); Palkesh Jain, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 135 days.

(21) Appl. No.: 18/917,898

(22) Filed: Oct. 16, 2024

(65) Prior Publication Data

US 2026/0103046 A1 Apr. 16, 2026

(51) Int. Cl.
*B60H 1/00* (2006.01)
*B60H 1/22* (2006.01)
*B60H 1/32* (2006.01)

(52) U.S. Cl.
CPC .................... *B60H 1/00978* (2013.01); *B60H 2001/00307* (2013.01); *B60H 2001/2253* (2013.01); *B60H 2001/3286* (2013.01)

(58) Field of Classification Search
CPC ...... B60H 1/00978; B60H 2001/00307; B60H 2001/3286; G06F 1/3206; B60R 16/023; B60R 16/03
See application file for complete search history.

(56) References Cited

U.S. PATENT DOCUMENTS

| | | | | |
|---|---|---|---|---|
| 12,296,651 | B2 * | 5/2025 | Wen | B60H 1/00271 |
| 12,373,011 | B2 * | 7/2025 | Repac | B60R 16/02 |
| 2013/0013169 | A1 * | 1/2013 | Eser | F02D 41/1454 701/102 |
| 2018/0157299 | A1 | 6/2018 | Goh et al. | |
| 2021/0011534 | A1 | 1/2021 | Yin et al. | |
| 2021/0094489 | A1 | 4/2021 | Damaraju et al. | |
| 2023/0322273 | A1 * | 10/2023 | Liu | B60W 50/12 701/23 |
| 2024/0077920 | A1 * | 3/2024 | Cheng | G05D 22/02 |
| 2024/0092287 | A1 | 3/2024 | Suzuki et al. | |
| 2025/0301613 | A1 * | 9/2025 | Miyoshi | B60H 1/00885 |

OTHER PUBLICATIONS

International Search Report and Written Opinion—PCT/US2025/047588—ISA/EPO—Feb. 13, 2026.

* cited by examiner

*Primary Examiner* — Marc E Norman
(74) *Attorney, Agent, or Firm* — SEYFARTH SHAW LLP

(57) ABSTRACT

A method for steady on-chip operation during an automotive thermal malfunction is described. The method includes monitoring a cooling system of a system-on-chip (SoC) during operation of a vehicle control sub-system. The method also includes detecting a thermal failure of the cooling system in response to the monitoring. The method further includes activating a lower power mode of the SoC in response to the detecting of the thermal failure. The method also includes switching to a manual vehicle control.

17 Claims, 8 Drawing Sheets

SYSTEM TO ENSURE SMOOTH ON-CHIP OPERATION DURING AUTOMOTIVE COOLING PUMP MALFUNCTION

BACKGROUND

Field

Aspects of the present disclosure relate to automotive systems, and in particular, to a system for ensuring smooth on-chip operation during an automotive cooling pump malfunction.

Background

Vehicle or automotive control systems are typically subjected to more stringent operational requirements. This is because errors in such vehicle or automotive control systems may result in severe injury and death to humans occupying associated vehicles, as well as humans, animals, and property that may collide with such vehicles. Such stringent operational requirements typically deal with system redundancy, greater resistance to electrical and software faults, and improved monitoring of such systems, to name a few. Additionally, automotive thermal specifications are of particular interest to a system-on-chip (SoC) configured for implementing automotive applications (e.g., advanced driver assistance systems (ADAS), a fully autonomous driving system, etc.). In particular, thermal issues may lead to a shutdown of the SoC, which leads to failure of the automotive applications.

SUMMARY

A method for steady on-chip operation during an automotive thermal malfunction is described. The method includes monitoring a cooling system of a system-on-chip (SoC) during operation of a vehicle control sub-system. The method also includes detecting a thermal failure of the cooling system in response to the monitoring. The method further includes activating a lower power mode of the SoC in response to the detecting of the thermal failure. The method also includes switching to a manual vehicle control.

A vehicle system is described. The vehicle system includes a vehicle control sub-system. The vehicle system also includes one or more processor cores coupled to the vehicle control sub-system. The vehicle system also further includes a heat exchanger (HX) coupled to the one or more processor cores through a coolant pump. The vehicle system also includes a thermal safety sub-system to activate a lower power mode of the vehicle control sub-system in response to detection of a thermal failure of the HX and/or the coolant pump.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
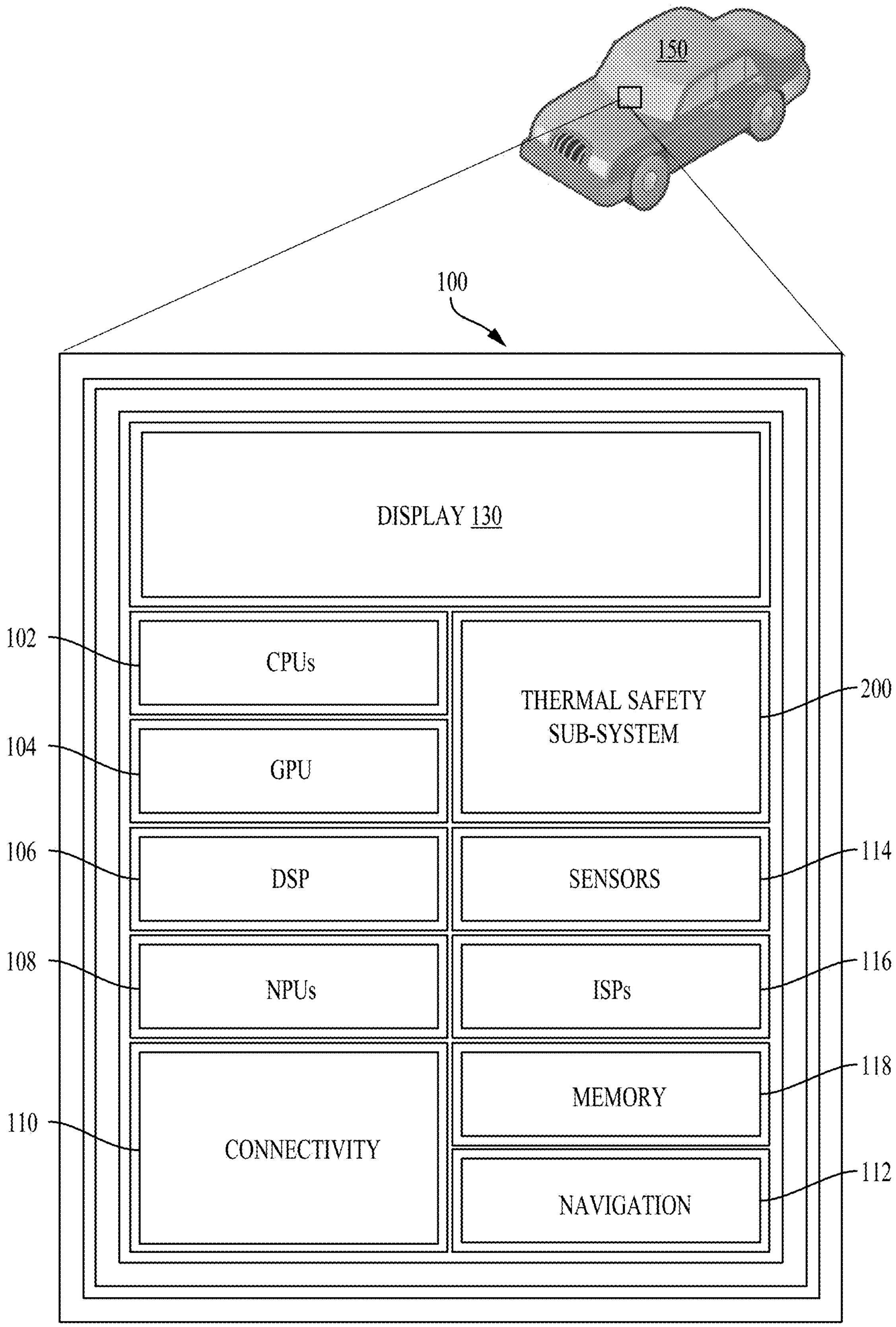
FIG. 1 is a block diagram illustrating a system-on-chip (SoC) having a thermal safety sub-system (TSSS) to ensure smooth on-chip operation during an automotive thermal malfunction, in accordance with various aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

Electronic circuits designed for vehicle or automotive control, or other safety-related applications are typically prescribed with more stringent specifications. These stringent specifications are prescribed because faults in automotive control circuits may result in severe injury and death to humans. There are governmental organizations that prescribe the specifications of electronic circuits for automotive control and other safety-related applications. These organization include the International Organization for Standardization (ISO) and the International Electrotechnical Commission (IEC).

For example, the ISO has prescribed international standard ISO 26262 entitled "Road vehicles—Functional safety," which provides specifications for functional safety of electrical and/or electronic systems in serial production road vehicles. The IEC has prescribed an international standard IEC 61508 entitled "Functional Safety of Electrical/Electronic/Programmable Electronic Safety-related Systems," which outlines methods on how to apply, design, deploy and maintain automatic protection systems called safety-related systems. In both ISO 26262 and IEC 61508, their specifications state that certain safety-related systems be continuously monitored during runtime in order to ensure proper operations of the safety-related items.

In automotive applications, such as advanced driver assistance systems (ADAS) or fully autonomous driving (e.g., safety critical automotive applications), thermal runaway is a significant problem. As described, thermal runaway refers to a process that is accelerated by increased temperatures, leading to a release of energy that further increases the temperature. In particular, thermal runaway in a system-on-chip (SoC) executing an automotive application may result in catastrophic events. For example, failure of a cooling system pump and/or a radiation/heat exchanger (e.g., a thermal event) causes a dramatic ramp in temperatures of the SoC, resulting in an SoC shutdown. This shutdown of the SoC leads to failure of the automotive application (e.g., the ADAS or fully autonomous driving system).

According to various aspects of the present disclosure, in case of a thermal event, the SoC is configured to function at lower modes of operation. For example, the SoC may remain in the lower mode of operation until the driver of the vehicle regains manual vehicle control and/or brings the vehicle to a safe stopping location. In some implementations, the vehicle receives guidance from a safety island (SAIL) of the SoC to switch to a lower power mode (e.g., a lower speed, a safe lane change, a parking mode, etc.).

Various aspects of the present disclosure enable a protective system designed to ensure smooth on-chip operation during automotive thermal malfunction, which prevents thermal damage and maintains safe vehicle operation. In some implementations, various sensor information is utilized to sound a thermal alarm, which enables the SoC to proactively mitigate thermal events. For example, mitigation of the thermal events may be guided by using an internal built thermal read-only-memory (ROM) system. According to various aspects of the present disclosure, the protective system incorporates failsafe features to ensure the SoC effectively oversees unforeseen off-chip thermal events.

FIG. 1 illustrates an example implementation of a thermal safety sub-system (TSSS) to ensure smooth on-chip operation during automotive thermal malfunction using a system-on-chip (SoC) 100 of a vehicle 150. The SoC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SoC 100 may also include additional processing blocks configured to perform specific functions, such as the GPU 104, the DSP 106, and a connectivity block 110, which may include sixth generation (6G) cellular network technology, fifth generation (5G) new radio (NR) technology, fourth generation long term evolution (4G LTE) connectivity, unlicensed WIFI connectivity, USB connectivity, Bluetooth® connectivity, and the like. In addition, a multimedia processor (not shown) in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SoC 100 may further include a sensor processor 114, image signal processors (ISPs) 116, and/or navigation 112, which may, for instance, include a global positioning system.

The SoC 100 may be based on an Advanced Risk Machine (ARM) instruction set or the like. Each processor core of the multi-core CPU 102 may be a reduced instruction set computing (RISC) machine, RISC-V, an advanced RISC machine (ARM), a microprocessor, or any reduced instruction set computing (RISC) architecture. The NPU 108 may be based on an ARM instruction set. In another aspect of the present disclosure, the SoC 100 may be a server computer in communication with the vehicle 150. In this arrangement, the vehicle 150 may include a processor and other features of the SoC 100. In this aspect of the present disclosure, instructions loaded into a thermal safety sub-system (TSSS) 200 of the vehicle 150 may include program code to ensure smooth on-chip operation of the SoC 100 during automotive thermal malfunction.

As shown in FIG. 1, the SoC 100 may be used in an automotive control system or other type of safety-related system. The SoC 100 may include a set of subsystems (not shown) to perform various operations in accordance with the design specification for the SoC 100. For example, in the case of automotive control, the set of subsystems may include semiautonomous or autonomous driving subsystems (e.g., Advanced Driver Assistance Systems (ADAS)), such as forward collision warning (FCW), lane departure warning (LWA), blind spot detection (BSD) subsystems (e.g., ADAS level "0" subsystems); adaptive cruise control (ACC) and lane keep assist (LKA) subsystems (e.g., ADAS level "1" subsystems); ACC with lane keeping and traffic jam assist subsystems (e.g., ADAS level "2" subsystems); highway autopilot and traffic jam pilot subsystems (e.g., ADAS level "3" subsystems); full highway autopilot and full urban autopilot subsystems (e.g., ADAS level "4" subsystems); and robo-taxi/shuttles and autonomous delivery fleets subsystems (e.g., ADAS level "5" subsystems).

In automotive applications, such as advanced driver assistance systems (ADAS) or fully autonomous driving (e.g., safety critical automotive applications), thermal malfunction presents a significant problem. For example, automotive thermal specifications demand a sustained junction temperature (Tj) (e.g., 115° C.) during automotive application operation in field, such as during operation of the vehicle ADAS. In practice, the cooling system is designed to maintain safe junction temperatures (Tj) for high-performance use cases by utilizing air cooling and liquid cooling. Unfortunately, a malfunction of the cooling system may lead to thermal runaway.

As described, thermal runaway refers to a process that is accelerated by increased temperatures, leading to a release of energy that further increases the temperature. In particular, thermal runaway in a system-on-chip (SoC) executing an automotive application may result in catastrophic events. For example, failure of a cooling system pump and/or a radiation/heat exchanger (e.g., a thermal event) causes a dramatic ramp in temperature of the SoC, resulting in an SoC shutdown. This shutdown of the SoC leads to failure of the automotive application (e.g., the ADAS or fully autonomous driving system). A protective system designed to ensure smooth on-chip operation during automotive thermal malfunction is illustrated, for example, in FIG. 2.

Figure 2:
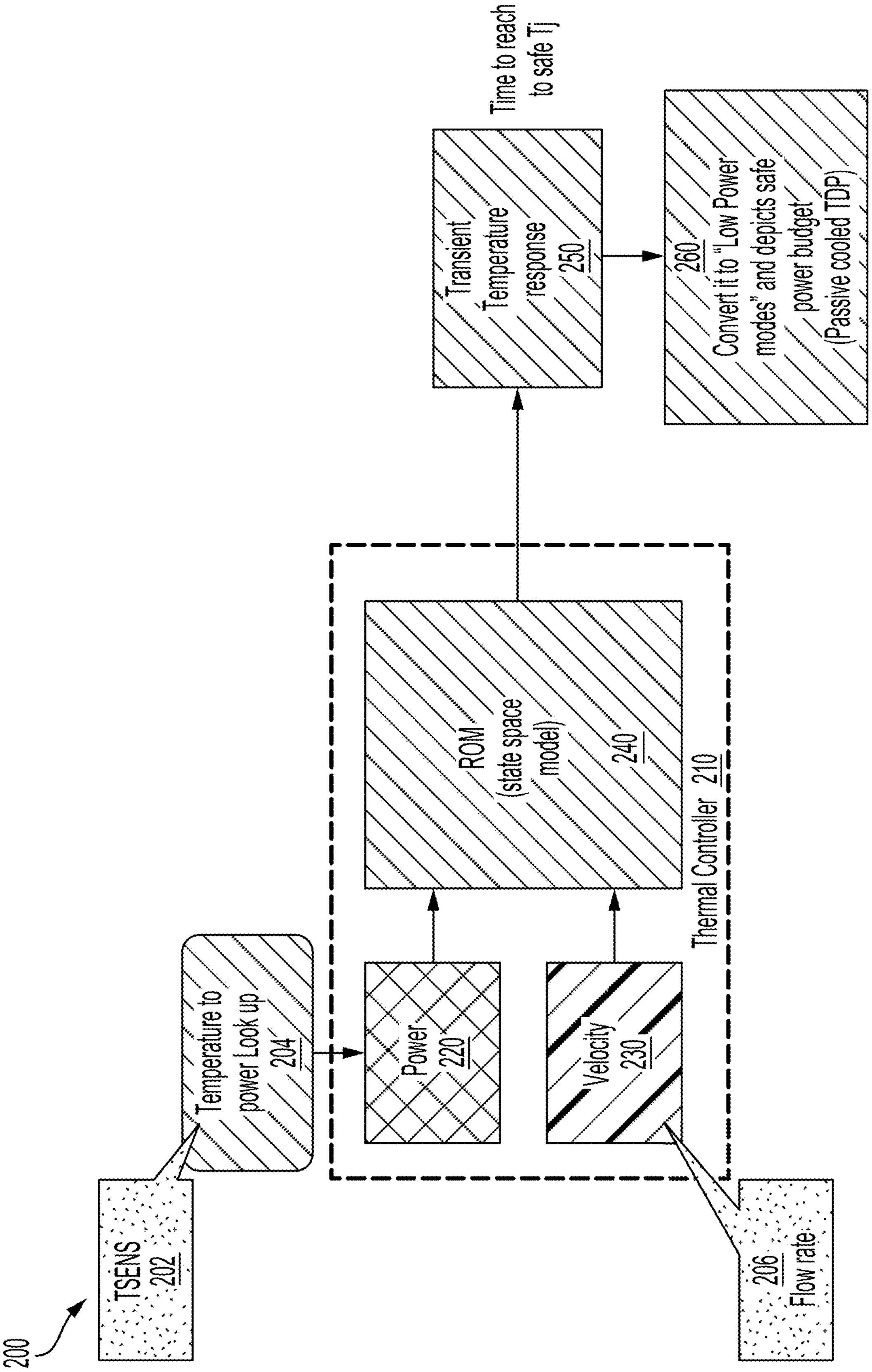
FIG. 2 is a block diagram further illustrating the thermal safety sub-system (TSSS) of FIG. 1, in accordance with various aspect of the present disclosure.

FIG. 2 is a block diagram further illustrating the thermal safety sub-system (TSSS) 200 of FIG. 1, in accordance with various aspects of the present disclosure. As shown in FIG. 2, the TSSS 200 includes a TSSS controller 210, which receives a thermal sensor (TSENS) signal 202 as well as a flow rate sensor signal 206. The TSENS signal 202 (e.g., an on-chip temperature sensor signal) may represent a current temperature of the SoC 100, and the flow rate sensor signal 206 may represent a current flow rate of a coolant pump of a thermal cooling system. In this example, the TSENS signal 202 is converted to a power value 220 using a temperature-to-power lookup table 204. Additionally, the flow rate sensor signal 206 is converted to a velocity value 230.

According to various aspects of the present disclosure, the TSSS controller 210 includes a thermal state space model 240, which is stored in memory (e.g., read-only memory (ROM)). In some implementations, the thermal state space model 240 is trained to predict a transient temperature response 250 in response to the power value 220 and the velocity value 230. In this example, the transient temperature response 250 indicates an amount of time to reach a safe thermal junction (Tj) temperature during an automotive temperature malfunction. As noted, automotive thermal specifications demand a sustained junction temperature (Tj) (e.g., 115° C.) during automotive application operation in field, such as during operation of the vehicle advanced driver assistance system (ADAS).

During an automotive thermal malfunction, the thermal junction Tj temperature exceeds a safe Tj temperature (e.g., 115° C.). In response to the automotive thermal malfunction, the TSSS 200 is configured to perform mitigation actions to enable smooth operation of the SoC 100 during automotive application operation in field, such as during operation of the vehicle ADAS. For example, the TSSS 200 may immediately activate a lower power mode of the SoC 100, which can increase a time delta for performing a safe vehicle stop or manual takeover of the vehicle. Alternatively, as shown in block 260, operation of the SoC 100 is maintained at a power equivalent to a passive cooled thermal power envelope (e.g., according to a thermal design power (TDP) of the SoC 100) once a signal is generated regarding a failure in a coolant flow/temperature (e.g., an automotive thermal event), as shown in FIG. 3.

Figure 3:
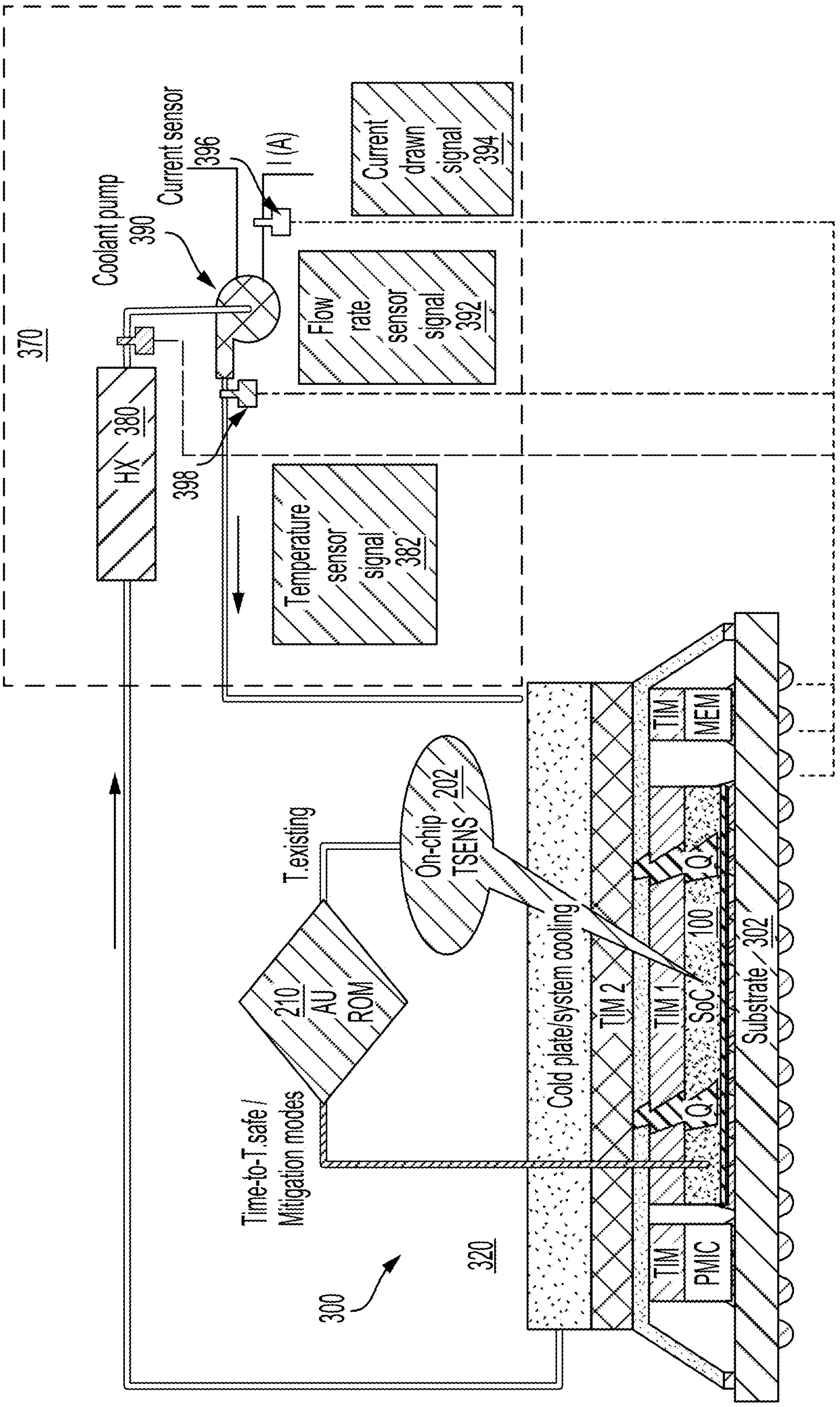
FIG. 3 is a block diagram illustrating integration of the thermal safety sub-system (TSSS) of FIG. 2 with a thermal cooling system, in accordance with various aspects of the present disclosure.

FIG. 3 is a block diagram illustrating integration of the thermal safety sub-system (TSSS) 200 of FIG. 2 with a thermal cooling system, in accordance with various aspects of the present disclosure. As shown in FIG. 3, a cooling system 370 includes a radiator/heat exchanger (HX) 380 and a coolant pump 390 coupled to a system-on-chip (SoC) package 300. In this example, the SoC package 300 includes the SoC 100 supported by a substrate 302 and includes a first thermal interface material (TIM1) and a second thermal interface material (TIM2) supporting a cold plate 320 coupled to the coolant pump 390. In this example, the SoC package 300 includes the TSSS controller 210 to provide the transient response (e.g., a time to reach a safe thermal junction (Tj) temperature and/or a mitigation mode) in response to the TSENS signal 202.

As noted, automotive thermal specifications demand a sustained junction temperature (Tj) (e.g., 115° C.) during automotive application operation in field, such as during operation of the vehicle advanced driver assistance system (ADAS). In practice, the cooling system 370 is designed to maintain safe junction temperatures (Tj) for high-performance use cases by utilizing air cooling and liquid cooling through the coolant pump 390. According to various aspects of the present disclosure, the TSSS controller 210 continuously monitors a flow rate of the coolant pump 390 using a flow rate sensor signal 392 measured by a flow rate sensor 398, and a thermal junction Tj temperature using a temperature sensor signal 382 of the HX 380 (e.g., a coolant temperature sensor signal).

As shown in FIG. 3, a thermal read-only memory (ROM) of the TSSS controller 210 continuously outputs time to reach a safe thermal junction Tj temperature (Time-to-T.safe), which is similar to the transient temperature response 250, as shown in FIG. 2. Once the flow rate sensor signal 392 incurs a flow rate stop (e.g., a zero (0) flow rate) or a flow rate below a desired value or the temperature sensor signal 382 indicates a coolant temperature beyond a safe limit, a thermal malfunction event is detected. Additionally, a current drawn signal 394 measured by a current sensor 396 of the coolant pump 390 is provided to the TSSS controller 210.

According to various aspects of the present disclosure, a thermal malfunction event is detected during the following scenarios. In a first scenario, if the coolant pump 390 fails, the Tj temperature is expected to drastically increase and exceeds the safe Tj temperature limit. Continued vehicle operation in this first scenario leads to a thermal runaway and eventual shut down of the SoC package 300. In a second scenario, the HX 380 fails, and the flow rate remains constant; however, the temperature of the coolant (e.g., from the temperature sensor signal 382) begins rising. In the second scenario, a gradient information of the temperature (e.g., a derivative of the temperature (dT/dt)) can provide an early signal for activating a lower power mitigation mode. In a third scenario, as the flow rate of the coolant pump 390 falls, the current drawn (e.g., according to the current drawn signal 394 measured by the current sensor 396) by the motor of the coolant pump 390 also falls. Falling of the current drawn by the coolant pump 390 (e.g., below a predetermined value) further provides an early warning signal of the possible start of a temperature ramp. In the third scenario, a lower power mitigation mode is activated immediately to increase the time delta to a safe stop or manual takeover of the vehicle.

According to various aspects of the present disclosure, feeding back the coolant temperature, the flow rate, and the current drawn by the coolant pump 390 enables current-based task mitigation for safety critical automotive application. The cooling system 370 utilizes the flow rate sensor signal 392 measured by the flow rate sensor 398, the temperature sensor signal 382, and the current drawn signal 394 to measure the flow rate, coolant temperature, and a drive current of the motor of the coolant pump 390. The signals from these sensors are directly provided to the TSSS controller 210 for proactively mitigating workload using the internal built, thermal state space model 240, as shown in FIG. 2. This solution offers valuable seconds before thermal runaway occurs.

Figure 4:
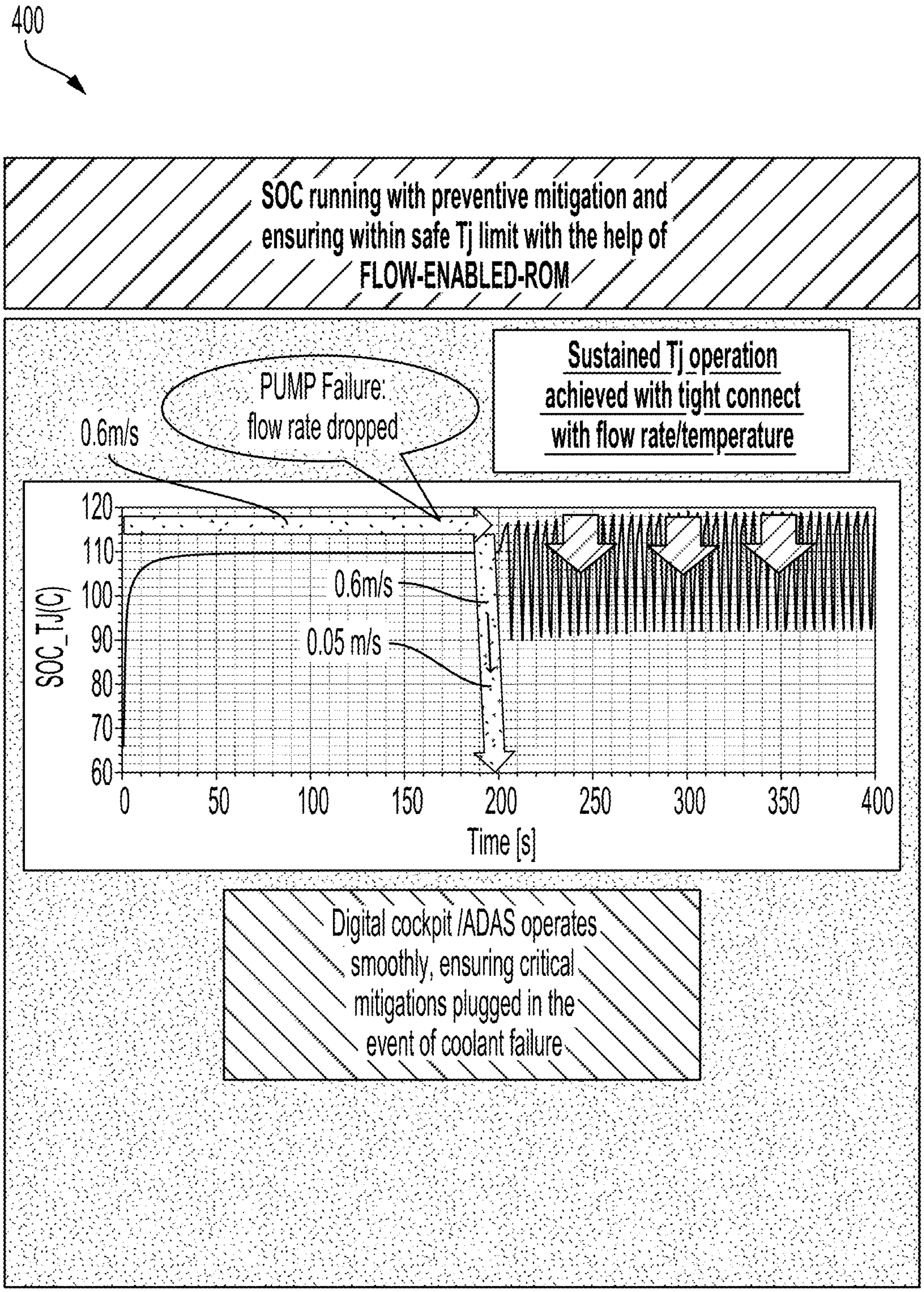
FIG. 4 illustrates a block diagram of an example of smooth on-chip operation during an automotive thermal malfunction, in accordance with various aspects of the present disclosure.

FIG. 4 illustrates a block diagram of an example of smooth on-chip operation during an automotive thermal malfunction, in accordance with various aspects of the present disclosure. As shown in FIG. 4, the SoC 100 is running with preventive mitigation for ensuring a safe Tj temperature utilizing the TSSS controller 210, as shown in FIG. 2, which is configured with the thermal state space model 240 (e.g., a flow-enabled-read-only memory (ROM)). As shown in the timeline 400 of FIG. 4, a pump failure is detected in response to a sensed flow rate drop. In response, sustained Tj temperature operation is achieved by utilizing a low power mode mitigation that is tightly connected with a flow rate/temperature of a coolant pump. Additionally, a digital cockpit/ADAS operates smoothly by initiating current mitigation in the event of a coolant failure.

Figure 5:
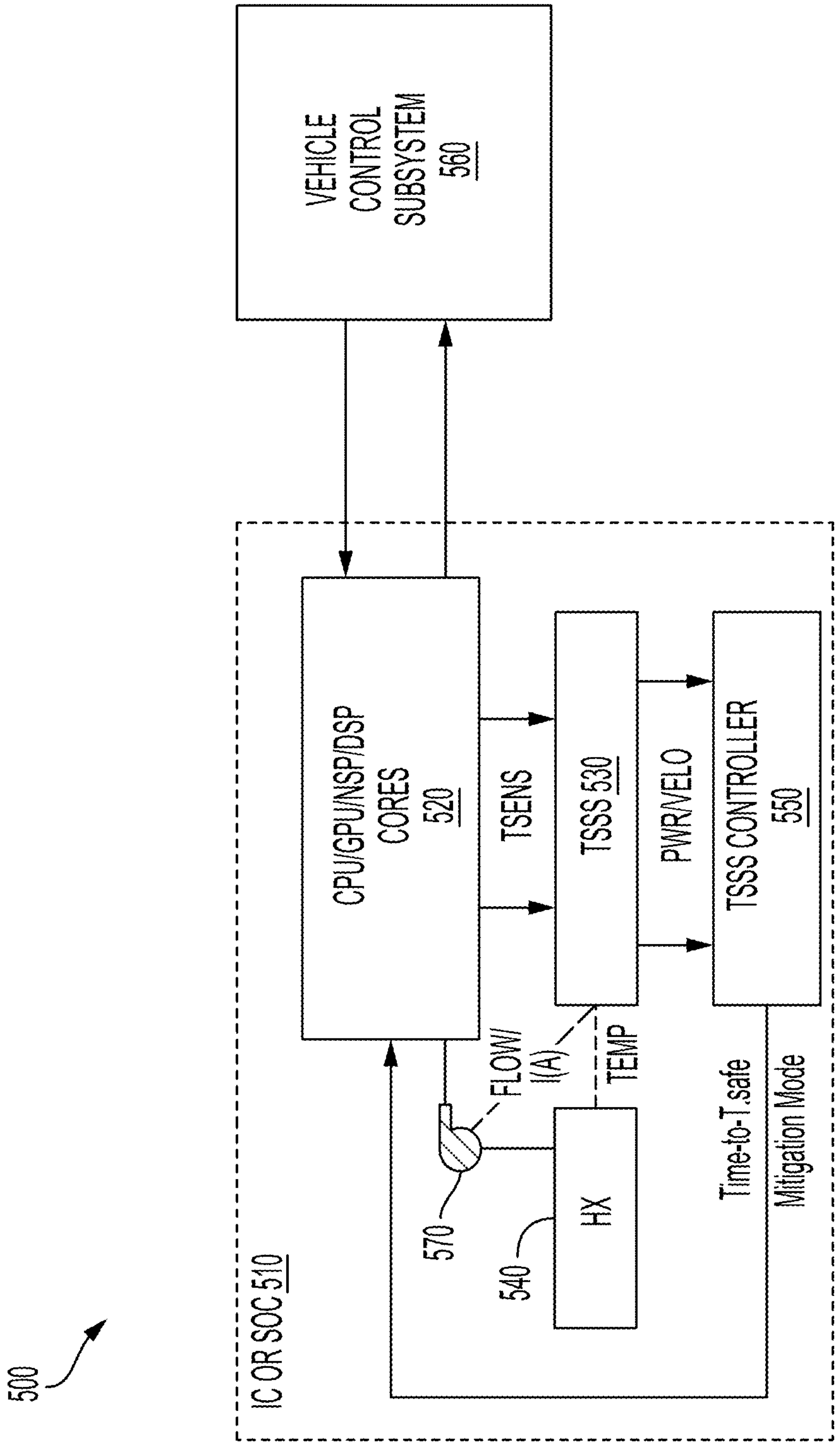
FIG. 5 illustrates a block diagram of an example vehicle system having a thermal safety sub-subsystem (TSSS), in accordance with various aspects of the present disclosure.

FIG. 5 illustrates a block diagram of an example vehicle system 500 having a thermal safety sub-subsystem (TSSS), in accordance with various aspects of the present disclosure. In this example, the vehicle system 500 pertains to an automotive system, but it shall be understood that other types of systems may employ a TSSS, as described.

The vehicle system 500 includes an integrated circuit (IC) 510, which may be configured as a system-on-chip (SoC). The IC 510 includes a set of one or more central processing unit (CPU)/graphics processing unit (GPU)/neural signal processor (NSP)/digital signal processing (DSP) cores 520, which, in turn, includes an internal temperature sensor (TSENS). The TSENS measures a temperature of the set of the CPU/GPU/NPU/DSP cores 520 (e.g., one or more processor cores) during operation of a vehicle control sub-system 560.

The IC 510 further includes a thermal safety sub-system (TSSS) 530. In this example, a heat exchanger (HX) 540 feeds back a coolant temperature (TEMP), a flow rate (FLOW), and a current (I(A)) drawn by a coolant pump 570 to the TSSS 530. Using the coolant temperature (TEMP), a flow rate (FLOW), and a current (I(A)), and the TSENS enables the TSSS 530 to provide a power and velocity (PWR/VELO) to a TSSS controller 550 for providing a current-based task mitigation for safety critical automotive applications (e.g., the vehicle control sub-system 560). The PWR/VELO signals from the TSSS 530 are directly provided to the TSSS controller 550 for proactively mitigating an SoC workload. For example, as shown in FIG. 2, the TSSS controller 210 uses the internal built, thermal state space model 240, which outputs a transient temperature response 250 (e.g., Time-to-F.safe/Mitigation Mode) for proactively mitigating a workload of the CPU/GPU/NPU/DSP cores 520 during operation of the vehicle control sub-system 560. This solution offers valuable seconds before thermal runaway occurs, as previously discussed.

The vehicle control sub-system 560 may include such components as a cruise control subsystem, a forward collision warning (FCW) subsystem, lane departure warning (LDW) subsystem, blind spot detection (BSD) warning subsystem, adaptive cruise control (ACC) subsystem, lane keep assist (LKA) subsystem, ACC with lane keeping subsystem, traffic jam assist subsystem, full highway autopilot subsystem, full urban autopilot subsystem, robo-taxi/shuttle subsystem, autonomous delivery fleet subsystem, or another like vehicle subsystem. A process for operation of the TSSS 530/TSSS controller 550 is shown, for example, in FIG. 6.

Figure 6:
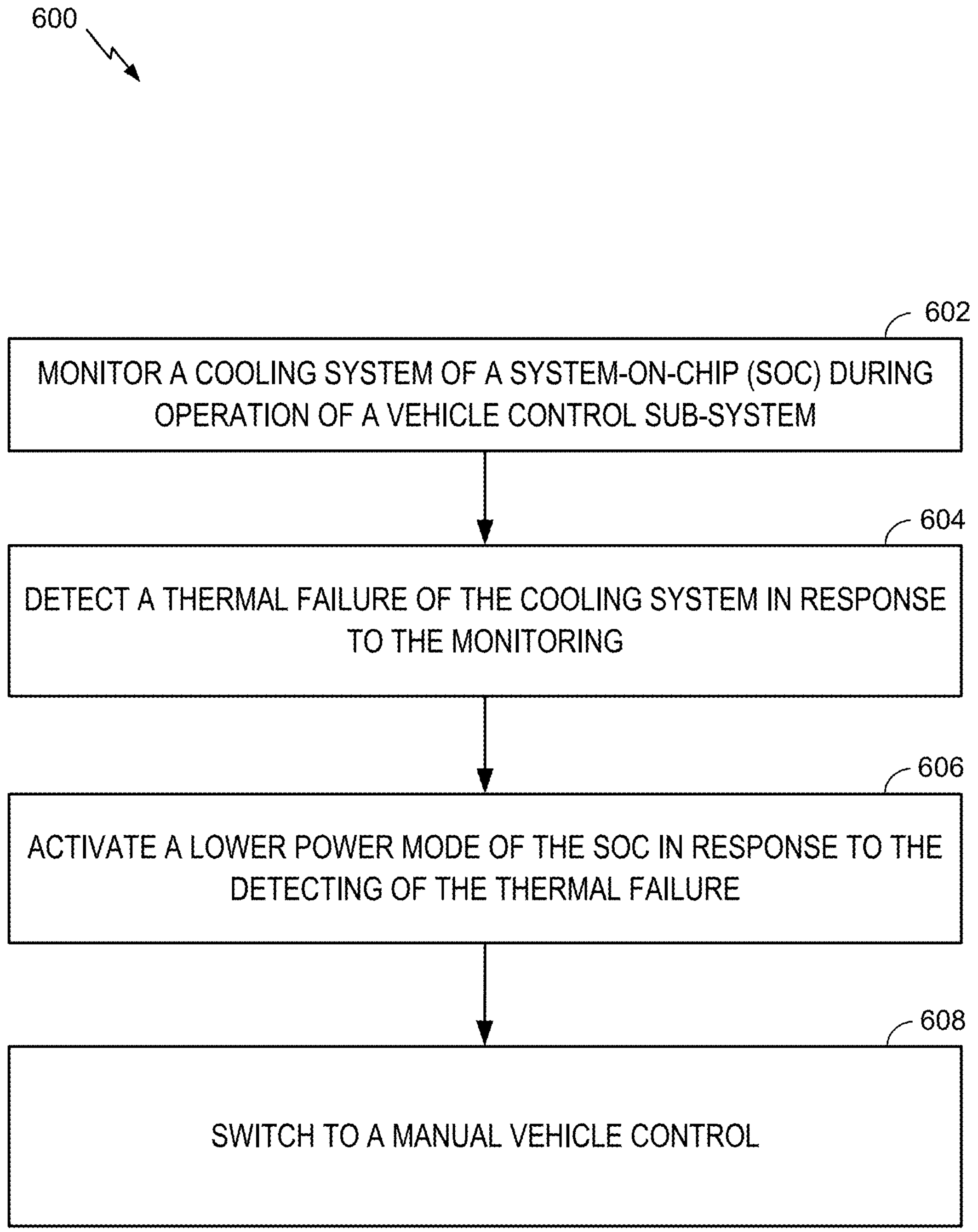
FIG. 6 is a process flow diagram illustrating a method for ensuring smooth on-chip operation during an automotive thermal malfunction, according to various aspects of the present disclosure.

FIG. 6 is a process flow diagram illustrating a method 600 for ensuring smooth on-chip operation during an automotive thermal malfunction, according to various aspects of the present disclosure. The method 600 begins at block 602, in which a cooling system of a system-on-chip (SoC) is monitored during operation of a vehicle control sub-system. For example, as shown in FIG. 3, the TSSS controller 210 continuously monitors a flow rate of the coolant pump 390 using a flow rate sensor signal 392 measured by a flow rate sensor 398, and a thermal junction Tj temperature using a temperature sensor signal 382 of the HX 380 (e.g., a coolant temperature sensor signal).

At block 604, a thermal failure of the cooling system detect in response to the monitoring at block 602. For example, as shown in FIG. 3, a thermal malfunction event is detected during the following scenarios. In a first scenario, if the coolant pump 390 fails, the Tj temperature is expected to drastically increase and exceeds the safe Tj temperature limit. Continued vehicle operation in this first scenario leads to a thermal runaway and eventual shut down of the SoC package 300. In a second scenario, the HX 380 fails, and the flow rate remains constant; however, the temperature of the coolant (e.g., from the temperature sensor signal 382) begins rising. In the second scenario, a gradient information of the temperature (e.g., a derivative of the temperature (dT/dt)) can provide an early signal for activating a lower power mitigation mode. In a third scenario, as the flow rate of the coolant pump 390 falls, the current drawn (e.g., according to the current drawn signal 394 measured by the current sensor 396) by the motor of the coolant pump 390 also falls. Falling of the current drawn by the coolant pump 390 (e.g., below a predetermined value) further provides an early warning signal of the possible start of a temperature ramp.

At block 606, a lower power mode of the SoC is activated in response to the detecting of the thermal failure. For example, a lower power mitigation mode is activated immediately to increase the time delta to a safe stop or manual takeover of the vehicle in at least the three noted scenarios with reference to block 604. At block 608, a switch is performed to a manual vehicle control to increase the time delta to a safe stop or manual takeover of the vehicle.

Various aspects of the present disclosure are directed to a system-on-chip (SoC) level implementation of a system level safety mechanism. In some implementations, circuitry is provided to detect failure of system level components critical for safe operation of SoC in automotive applications. For example, a thermal failure is detected by monitoring a coolant pump flow rate, a coolant temperature, a current draw of the coolant pump, an on-chip temperature sensor, and the like. According to various aspects of the present disclosure, a thermal safety sub-system (TSSS) is configured to switch an SoC into sufficiently low power mode in case of a thermal failure. Additionally, the TSSS is configured operate on selected and specific portion of the SoC in-field.

Figure 7:
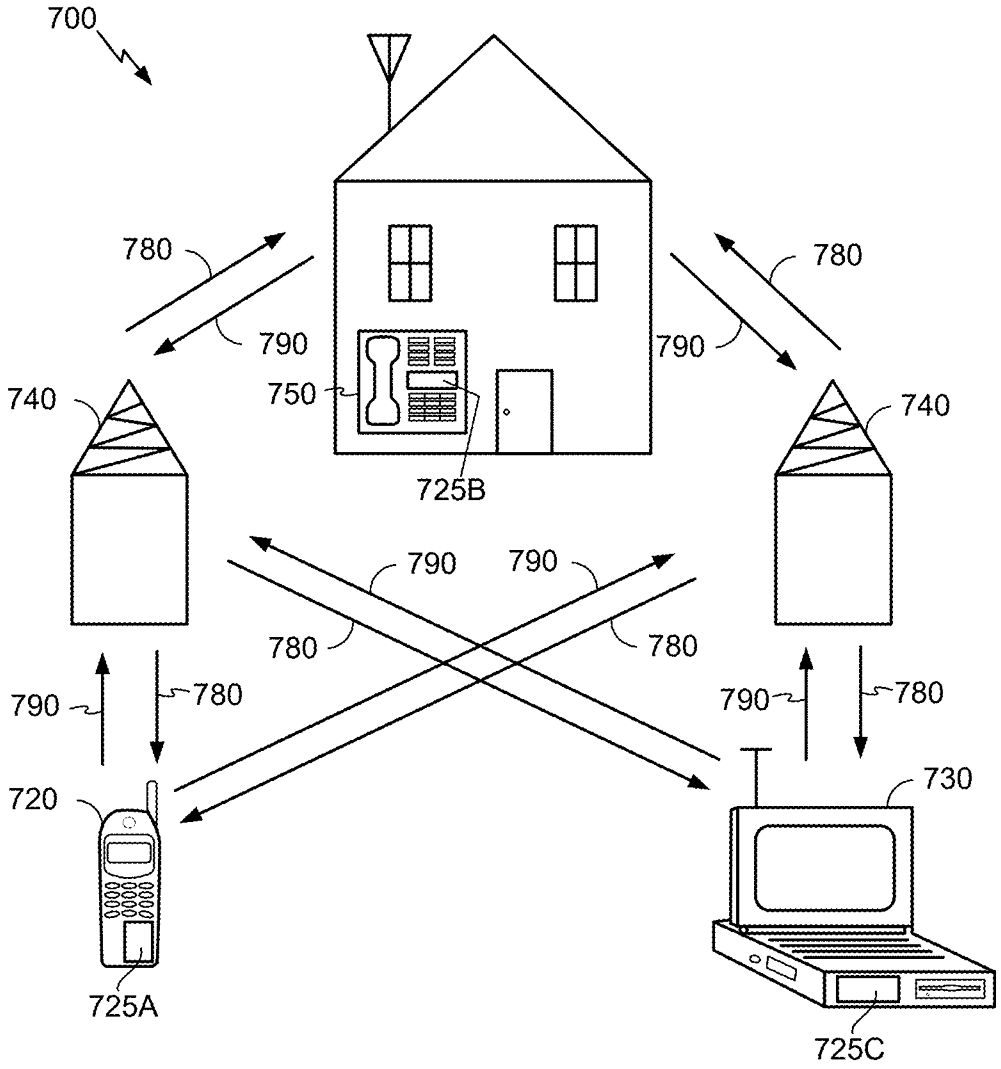
FIG. 7 is a block diagram showing an exemplary wireless communications system in which an aspect of the present disclosure may be advantageously employed.

FIG. 7 is a block diagram showing an exemplary wireless communications system 700 in which an aspect of the present disclosure may be advantageously employed. For purposes of illustration, FIG. 7 shows three remote units 720, 730, and 750 and two base stations 740. It will be recognized that wireless communications systems may have many more remote units and base stations. Remote units 720, 730, and 750 include integrated circuit (IC) devices 725A, 725C, and 725B that include the disclosed thermal safety sub-system (TSSS). It will be recognized that other devices may also include the disclosed TSSS, such as the base stations 740, switching devices, and network equipment. FIG. 7 shows forward link signals 780 from the base stations 740 to the remote units 720, 730, and 750, and reverse link signals 790 from the remote units 720, 730, and 750 to the base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a communications device, personal digital assistant (PDA), a fixed location data unit, such as meter reading equipment, or other device that stores or retrieves data or computer instructions, or combinations thereof. Although FIG. 7 illustrates remote units according to the aspects of the present disclosure, the present disclosure is not limited to these exemplary illustrated units. Aspects of the present disclosure may be suitably employed in many devices, which include the disclosed TSSS.

Figure 8:
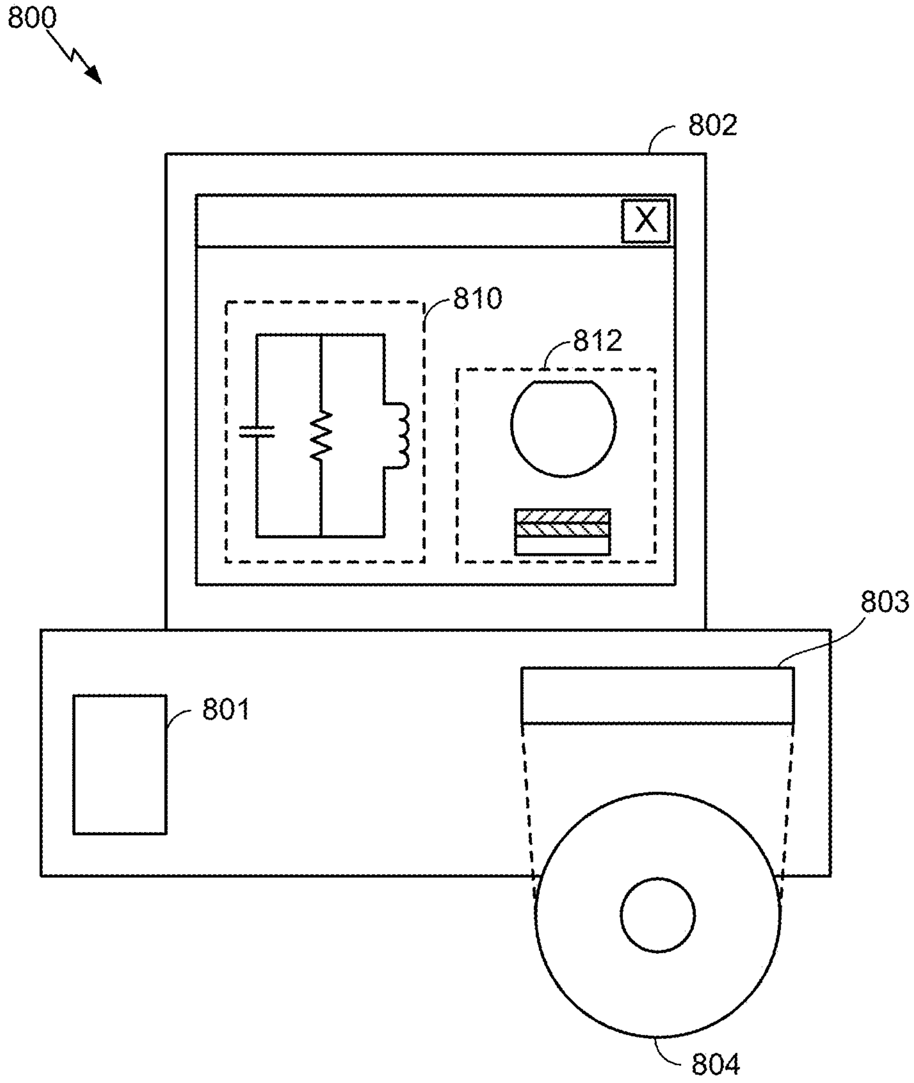
FIG. 8 is a block diagram illustrating a design workstation used for circuit, layout, and logic design of a semiconductor component, such as the thermal safety sub-system (TSSS) disclosed above.

FIG. 8 is a block diagram illustrating a design workstation used for circuit, layout, and logic design of a semiconductor component, such as the thermal safety sub-system (TSSS) disclosed above. A design workstation 800 includes a hard disk 801 containing operating system software, support files, and design software such as Cadence or OrCAD. The design workstation 800 also includes a display 802 to facilitate design of a circuit 810 or a radio frequency (RF) component 812 such as a system-on-chip (SoC) having a thermal safety sub-system (TSSS), as disclosed above. A storage medium 804 is provided for tangibly storing the design of the circuit 810 (e.g., the TSSS). The design of the circuit 810 may be stored on the storage medium 804 in a file format such as GDSII or GERBER. The storage medium 804 may be a compact disc read-only memory (CD-ROM), digital versatile disc (DVD), hard disk, flash memory, or another appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit 810 by decreasing the number of processes for designing semiconductor wafers.

Implementation examples are described in the following numbered clauses:

1. A method for steady on-chip operation during an automotive thermal malfunction, the method comprising:
   monitoring a cooling system of a system-on-chip (SoC) during operation of a vehicle control sub-system;
   detecting a thermal failure of the cooling system in response to the monitoring;
   activating a lower power mode of the SoC in response to the detecting of the thermal failure; and
   switching to a manual vehicle control.
2. The method of clause 1, in which the monitoring comprises:
   selecting a temperature sensor signal of a heat exchanger (HX);
   selecting an on-chip temperature sensor signal of the SoC;
   selecting a flow rate sensor signal of a coolant pump; and
   selecting a current drawn signal of the coolant pump.
3. The method of any of clauses 1 or 2, in which detecting the thermal failure comprises:
   selecting a temperature sensor signal of a heat exchanger (HX); and
   detecting the thermal failure if the temperature sensor signal of the HX is greater than a safe thermal junction (Tj) temperature.
4. The method of any of clauses 1 or 2, in which detecting the thermal failure comprises:
   selecting an on-chip temperature sensor signal; and
   detecting the thermal failure if the on-chip temperature sensor signal is greater than a safe thermal junction (Tj) temperature.
5. The method of any of clauses 1 or 2, in which detecting the thermal failure comprises:
   selecting a current drawn signal of a coolant pump; and
   detecting a failure of the coolant pump if the current drawn signal is less than a predetermined value.
6. The method of any of clauses 1 or 2, in which detecting the thermal failure comprises:
   selecting a flow rate signal of a coolant pump; and
   detecting a failure of the coolant pump if the flow rate signal is less than a predetermined value.
7. The method of any of clauses 1-6, in which activating the lower power mode comprises:
   converting a temperature sensor signal of a heat exchanger (HX) to a power value;
   converting a flow rate sensor signal of a coolant pump to a velocity value; and
   looking up a transient temperature response according to the power value and the velocity value.
8. The method of clause 7, in which looking up the transient temperature response comprises accessing a state space model according to the power value and the velocity value to determine an amount of time until a safe thermal junction (Tj) temperature is reached.
9. The method of any of clauses 1-6, in which activating the lower power mode comprises:
   determining a time to a safe thermal junction (Tj) temperature; and
   selecting the lower power mode according to the determining of the time to the safe junction (Tj) temperature.
10. The method of any of clauses 1-9, in which the cooling system comprises a coolant pump and a heat exchanger (HX).
11. A vehicle system, comprising:
    a vehicle control sub-system;
    one or more processor cores coupled to the vehicle control sub-system;

a heat exchanger (HX) coupled to the one or more processor cores through a coolant pump; and a thermal safety sub-system to activate a lower power mode of the vehicle control sub-system in response to detection of a thermal failure of the HX and/or the coolant pump.

12. The vehicle system of clause 11, further comprising:

a temperature sensor coupled to the heat exchanger (HX);

an on-chip temperature sensor coupled to a system-on-chip (SoC), including the one on more processor cores;

a flow rate sensor coupled to the coolant pump; and a current sensor coupled to the coolant pump.

13. The vehicle system of any of clauses 11 or 12, in which the thermal safety sub-system to detect the thermal failure when a temperature sensor signal of the HX is greater than a safe thermal junction (Tj) temperature.

14. The vehicle system of any of clauses 11 or 12, in which in which the thermal safety sub-system to detect the thermal failure when an on-chip temperature sensor signal is greater than a safe thermal junction (Tj) temperature.

15. The vehicle system of any of clauses 11 or 12, in which the thermal safety sub-system to detect the thermal failure when a current drawn signal of the coolant pump is less than a predetermined value.

16. The vehicle system of any of clauses 11 or 12, in which the thermal safety sub-system to detect the thermal failure when a flow rate signal of the coolant pump is less than a predetermined value.

17. The vehicle system of any of clauses 11-16, in which, to activate the lower power mode, the thermal safety sub-system is configured to:

convert a temperature sensor signal of the heat exchanger (HX) to a power value;

convert a flow rate sensor signal of the coolant pump to a velocity value; and lookup a transient temperature response according to the power value and the velocity value.

18. The vehicle system of clause 17, in which to lookup the transient temperature response, the thermal safety sub-system is further to access a state space model according to the power value and the velocity value to determine an amount of time until a safe thermal junction (Tj) temperature is reached.

19. The vehicle system of any of clauses 11-16, in which, to activate the lower power mode, the thermal safety sub-system is configured to:

determine a time to a safe thermal junction (Tj) temperature; and select the lower power mode according to the determining of the time to the safe junction (Tj)temperature.

20. The vehicle system of any of clauses 11-19, in which the thermal safety sub-system comprises a thermal safety sub-system (TSSS) controller.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function, or achieve substantially the same result as the corresponding configurations described, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

The previous description of the present disclosure is provided to enable any person skilled in the art to make or use the disclosure. Various modifications to the present disclosure will be readily apparent to those skilled in the art, and the generic principles defined may be applied to other variations without departing from the spirit or scope of the disclosure. Thus, the present disclosure is not intended to be limited to the examples and designs described but is to be accorded the widest scope consistent with the principles and novel features disclosed.

What is claimed:

1. A method for steady on-chip operation during an automotive thermal malfunction, the method comprising:
- while operating in an autonomous vehicle control mode, monitoring a cooling system comprising a coolant pump and a heat exchanger (HX) of a system-on-chip (SoC) during operation of a vehicle control sub-system;
- detecting a thermal failure of the cooling system in response to the monitoring;
- activating a reduced power mode of the SoC in response to the detecting of the thermal failure, the activating comprising:
- converting a temperature sensor signal of the heat exchanger (HX) to a power value;
- converting a flow rate sensor signal of the coolant pump to a velocity value;
- looking up a transient temperature response according to the power value and the velocity value; and
- switching from the autonomous vehicle control mode to a manual vehicle control.

2. The method of claim 1, in which the monitoring comprises:
- selecting a temperature sensor signal of the heat exchanger (HX);
- selecting an on-chip temperature sensor signal of the SoC;
- selecting a flow rate sensor signal of the coolant pump; and
- selecting a current drawn signal of the coolant pump.

3. The method of claim 1, in which detecting the thermal failure comprises:
- selecting a temperature sensor signal of the heat exchanger (HX); and
- detecting the thermal failure when the temperature sensor signal of the HX is greater than a safe thermal junction (Tj) temperature.

4. The method of claim 1, in which detecting the thermal failure comprises:
- selecting an on-chip temperature sensor signal; and
- detecting the thermal failure when the on-chip temperature sensor signal is greater than a safe thermal junction (Tj) temperature.

5. The method of claim 1, in which detecting the thermal failure comprises:
- selecting a current drawn signal of the coolant pump; and
- detecting a failure of the coolant pump when the current drawn signal is less than a predetermined value.

6. The method of claim 1, in which detecting the thermal failure comprises:

selecting a flow rate signal of the coolant pump; and detecting a failure of the coolant pump when the flow rate signal is less than a predetermined value.

7. The method of claim 1, in which looking up the transient temperature response comprises accessing a state space model according to the power value and the velocity value to determine an amount of time until a safe thermal junction (Tj) temperature is reached.

8. The method of claim 1, in which the activating comprises:

determining a time to a safe thermal junction (Tj) temperature; and selecting the reduced power mode according to the determining of the time to the safe junction (Tj) temperature.

9. A vehicle system, comprising:

a vehicle control sub-system configured to operate in an autonomous vehicle control mode;

one or more processor cores coupled to the vehicle control sub-system;

a cooling system comprising:

a heat exchanger (HX) coupled to the one or more processor cores through a coolant pump; and a thermal safety sub-system configured to activate a reduced power mode of the vehicle control sub-system in response to detection of a thermal failure of the HX and/or the coolant pump, the thermal safety sub-system configured to:

convert a temperature sensor signal of the heat exchanger (HX) to a power value;

convert a flow rate sensor signal of the coolant pump to a velocity value; and lookup a transient temperature response according to the power value and the velocity value.

10. The vehicle system of claim 9, further comprising:

a temperature sensor coupled to the heat exchanger (HX);

an on-chip temperature sensor coupled to a system-on-chip (SoC), including the one on more processor cores;

a flow rate sensor coupled to the coolant pump; and a current sensor coupled to the coolant pump.

11. The vehicle system of claim 9, in which the thermal safety sub-system is configured to detect the thermal failure when the temperature sensor signal of the HX is greater than a safe thermal junction (Tj) temperature.

12. The vehicle system of claim 9, in which the thermal safety sub-system is configured to detect the thermal failure when an on-chip temperature sensor signal is greater than a safe thermal junction (Tj) temperature.

13. The vehicle system of claim 9, in which the thermal safety sub-system is configured to detect the thermal failure when a current drawn signal of the coolant pump is less than a predetermined value.

14. The vehicle system of claim 9, in which the thermal safety sub-system is configured to detect the thermal failure when a flow rate signal of the coolant pump is less than a predetermined value.

15. The vehicle system of claim 9, in which, to lookup the transient temperature response, the thermal safety sub-system is configured to:

access a state space model according to the power value and the velocity value to determine an amount of time until a safe thermal junction (Tj) temperature is reached.

16. The vehicle system of claim 9, in which, to activate the reduced power mode, the thermal safety sub-system is further configured to:

determine a time to a safe thermal junction (Tj) temperature; and select the reduced power mode according to the determining of the time to the safe junction (Tj) temperature.

17. The vehicle system of claim 9, in which the thermal safety sub-system comprises a thermal safety sub-system (TSSS) controller.

* * * * *